United States Patent
Allo

(10) Patent No.: US 11,698,975 B2
(45) Date of Patent: Jul. 11, 2023

(54) DISTRIBUTED DATA STORAGE SYSTEM WITH BACKWARD ATTESTATION

(71) Applicant: Seagate Technology LLC, Cupertino, CA (US)

(72) Inventor: Christopher Nicholas Allo, Lyons, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 698 days.

(21) Appl. No.: 16/801,830

(22) Filed: Feb. 26, 2020

(65) Prior Publication Data

US 2021/0264037 A1 Aug. 26, 2021

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | |
|---|---|---|
| 6,912,621 B2 | 6/2005 | Harris |
| 7,707,638 B2 | 4/2010 | Dellow |
| 8,104,088 B2 * | 1/2012 | Khilnani ................. G06F 21/57 726/28 |
| 8,789,202 B2 * | 7/2014 | Touboul .................. G06F 21/56 707/782 |
| 9,716,594 B2 | 7/2017 | Offenberg et al. |
| 9,930,697 B2 | 3/2018 | Fan et al. |
| 10,073,530 B2 | 9/2018 | Moshfeghi |
| 10,402,577 B2 * | 9/2019 | Knapp ................ G06F 21/6218 |
| 10,938,789 B2 * | 3/2021 | Shadrin .................... G06F 21/84 |
| 11,170,104 B1 | 11/2021 | Stickle et al. |
| 11,250,132 B2 * | 2/2022 | Applebourn .......... G06F 21/566 |
| 11,449,643 B2 | 9/2022 | Allo |
| 2004/0250124 A1 | 12/2004 | Chesla et al. |
| 2008/0301776 A1 | 12/2008 | Weatherford |
| 2009/0199288 A1 | 8/2009 | Buch et al. |
| 2013/0275770 A1 | 10/2013 | Berger |

(Continued)

OTHER PUBLICATIONS

Non-Final Rejection for U.S. Appl. No. 16/786,368, dated Apr. 20, 2022, 28 pages.

(Continued)

*Primary Examiner* — Fatoumata Traore
(74) *Attorney, Agent, or Firm* — Westman, Champlin & Koehler, P.A.

(57) ABSTRACT

A distributed data storage system can have an attestation module that is connected to the data storage device to disconnect the device from a distributed data storage network or prevent the data storage device from being initialized into the distributed data storage network. A first security evaluation of the data storage device can be conducted with the attestation module to verify an authenticity of the data storage device. The attestation module may then disconnect the network controller from the distributed data storage network and verify an authenticity of the network controller to allow the network controller and data storage device to service a data access request from a host of the distributed data storage network.

18 Claims, 3 Drawing Sheets

(56) References Cited

U.S. PATENT DOCUMENTS

| | | |
|---|---|---|
| 2014/0020083 A1 | 1/2014 | Fetik |
| 2015/0347760 A1 | 12/2015 | Kruglick |
| 2015/0350239 A1 | 12/2015 | Kruglick |
| 2016/0352509 A1 | 12/2016 | Wu et al. |
| 2017/0230179 A1 | 8/2017 | Mannan et al. |
| 2018/0183855 A1 | 6/2018 | Sabella et al. |
| 2018/0262526 A1 | 9/2018 | Jain et al. |
| 2018/0365635 A1 | 12/2018 | Lucrecio et al. |
| 2018/0367314 A1 | 12/2018 | Egner et al. |
| 2019/0215150 A1 | 7/2019 | Shefaat et al. |
| 2019/0266359 A1 | 8/2019 | Li et al. |
| 2020/0120136 A1 | 4/2020 | Gadhe et al. |
| 2020/0162251 A1* | 5/2020 | Wentz ............. H04L 9/3239 |

OTHER PUBLICATIONS

Notice of Allowance and Fee(s) Due for U.S. Appl. No. 16/801,861, dated May 18, 2022, 13 pages.

* cited by examiner

DISTRIBUTED DATA STORAGE SYSTEM WITH BACKWARD ATTESTATION

SUMMARY

A distributed data storage system, in accordance with some embodiments, has an attestation module that is connected to the data storage device to disconnect the device from a distributed data storage network. The attestation module conducts a first security evaluation of the data storage device to verify an authenticity of the data storage device. The attestation module may then disconnects the network controller from the distributed data storage network and verifies an authenticity of the network controller with a second security evaluation to allow the network controller and data storage device to service a data access request from a host of the distributed data storage network.

Other embodiments of a distributed data storage system has an attestation module that is connected to the data storage device to prevent the data storage device from being initialized into the distributed data storage network. A first security evaluation of the data storage device is conducted with the attestation module to verify an authenticity of the data storage device before disconnecting the network controller from the distributed data storage network and verifying an authenticity of the network controller to allow the network controller and data storage device to service a data access request from a host of the distributed data storage network.

In various embodiments, an attestation module is resident on a printed circuit board and is configured to attest an authenticity of a distributed data storage network sequentially from a data storage device to a network controller of the distributed data storage network.

These and other features which may characterize various embodiments can be understood in view of the following detailed discussion and the accompanying drawings.

DETAILED DESCRIPTION

Embodiments of a distributed data storage system utilize backward attestation to optimize the security of the system, reliability of data stored in the system, and integrity of components of the system.

As the volumes of data being generated and transferred has grown with the sophistication of computing devices, and particularly mobile computing devices, the ability of computing systems to provide relatively large volumes of data storage that provide fast and reliable data access has been emphasized. Distributed data storage systems, in response, have been developed that utilize multiple data storage devices to provide greater data capacity and faster data access than a single data storage device alone. With the scaling of multiple data storage devices to provide even large volumes of data storage, the number of data storage devices being employed has created operational complexity, initialization delays, and security risks that jeopardize the performance of data accesses and integrity of data and system components.

With these issues in mind, multiple data storage devices being employed as part of a distributed data storage system can utilize an attestation module to validate the genuine trustworthiness of an edge computing device and attest a secure status of other system components from a backward direction. By validating a downstream data storage device first when the device is offline, the genuine and secure status of subsequent system components can be assured, once the device is brought online. The ability to establish a security network autonomously from the downstream data storage device backward to the hosts of a distributed data storage system, a security strategy can be executed that efficiently and securely implements protocols, settings, policies, and procedures that mitigate the risk of main and side channel attack by third-parties without degrading system boot or data access performance.

Figure 1:
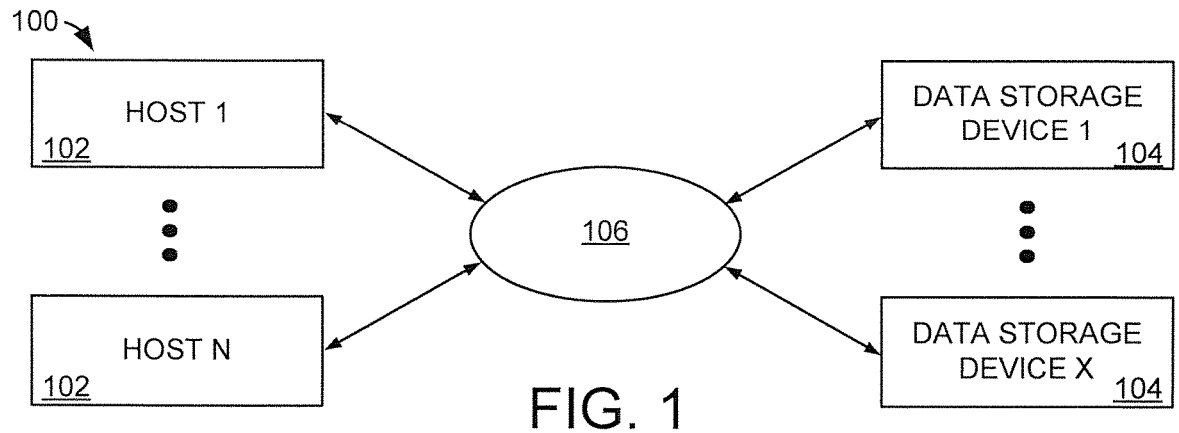
FIG. 1 provides a functional block representation of an example distributed data storage system in which various embodiments can be practiced.

Turning to the drawings, a functional block representation of an example distributed data storage system 100 is depicted in FIG. 1. The distributed data storage system 100 can be utilized, in assorted embodiments, with any number of hosts 102 connected to a plurality of data storage devices 104 via one or more wired and/or wireless data pathways that can be characterized as a network 106. It is contemplated that the various hosts 102 can be different computing components located in a single physical location or multiple different physical locations. Similarly, the data storage devices 104 may be matching, or dissimilar, types of data storage with any variety of data storage mechanisms, storage capacity, access speed, and physical size.

Figure 2:
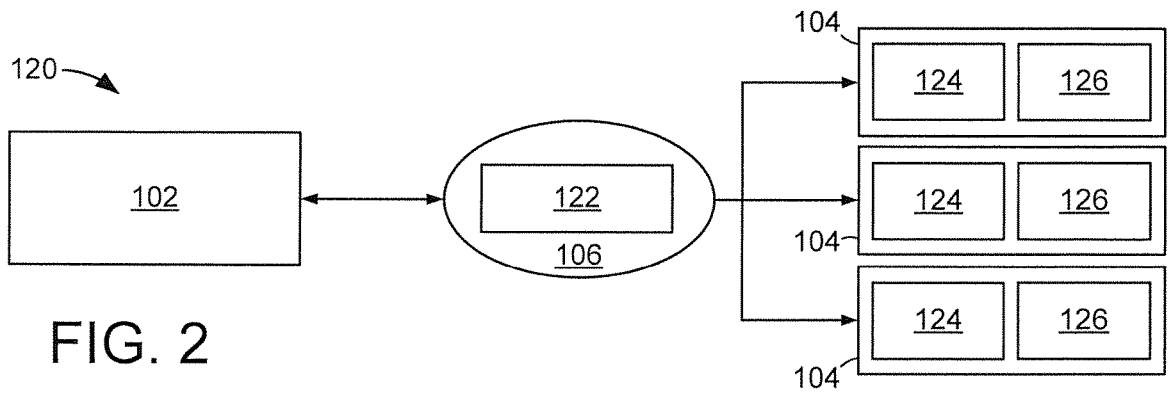
FIG. 2 depicts a block representation of aspects of an example distributed data storage system utilized in accordance with some embodiments.

The interconnection of the assorted hosts 102 and data storage devices 104 via the network 106 allows for efficient remote data storage and retrieval that can be scaled to provide greater, and more diverse, data storage capabilities. FIG. 2 depicts a functional block representation of a portion of an example distributed data storage system 120 that provides scaled data storage in accordance with some embodiments. A network controller 122 can be physically positioned anywhere in the network 106, such as in a server, router, switch, or node, and direct data access operations between hosts 102 and one or more data storage devices 104. It is contemplated that the network controller 122 operates in conjunction with local controllers 124 of the respective data storage devices 104 to store host-generated data to local memories 126 and subsequently retrieve such data upon request.

The network controller 122 can choreograph a variety of system 120 activities that are directed at providing reliable and authentic data access for a host 102. For instance, the network controller 122 can distribute data to multiple data storage devices 104, such as in a redundant array of independent disks (RAID) configuration, can generate data information, such as parity and/or error correction codes, can perform data maintenance, such as garbage collection and data mapping, and can attest the data storage devices 104 and/or the data being transferred. The use and capabilities of the network controller 122 can be diverse and provide the ability to handle a variety of data storage, data maintenance, data security, and system security operations in one or more data storage devices 104 independently and collectively.

Figure 3:
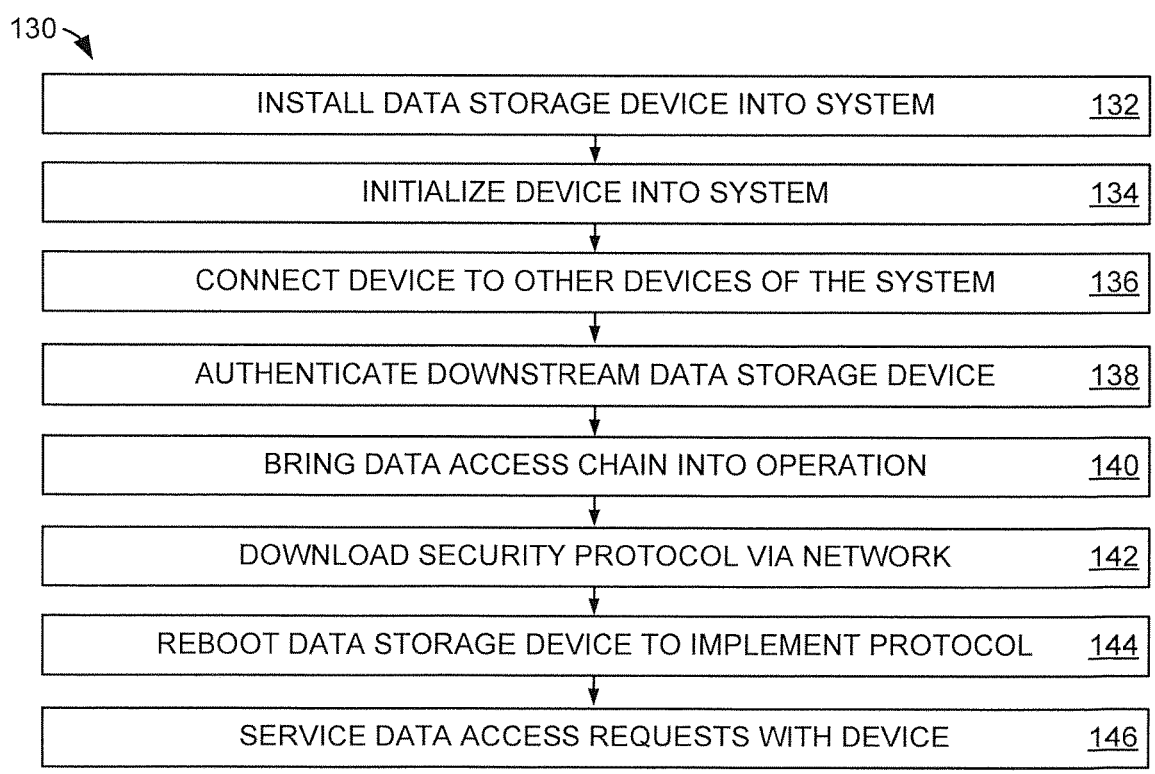
FIG. 3 displays an example installation routine that can be practiced in the data storage system of FIGS. 1 & 2 in accordance with assorted embodiments.

FIG. 3 depicts a timeline of an example installation routine 130 that can be carried out in accordance with some embodiments in the distributed data storage systems 100/120 of FIGS. 1 & 2. The installation of at least one data storage device 104 in step 132 into the data storage system involves the physical insertion and/or electrical connection of one or more data storage devices 104 to at least one network component 128, such as a server, router, switch, or node, in which a network controller 122 is resident. It is contemplated that a data storage device 104 can be the installed without being initialized to the data storage system. That is, an installed data storage device 104 can have the capability of storing data, but has not yet been setup for engagement and utilization for at least security protocol, settings, policies, and procedures derived from the system by the data storage network 106, network controller 122, or other data storage devices 104.

The installation of a new data storage device 104 into the system in step 132 leads to a subsequent electronic initialization of the device 104 in step 134, such as with one or more boot or startup operations. For example, one or more tests may be conducted on a data storage device 104 to ensure the presence and operation of one or more data storage device components, such as a memory array, bit line, or memory cell. In step 134, the data storage device 104 initialization may involve the execution of one or more software applications that enable the storage, and retrieval, of data by one or more system components 128. An initialized data storage device 104 can then be connected to other system devices and components via one or more wired, or wireless, network data pathways in step 136.

At any time prior to, or during, the connection of the new data storage device 104 to the distributed data storage system, various portions of the system are authenticated, which is collectively illustrated as step 138. The authentication of step 138 is contemplated to involve the sequential verification of at least network components and connected hosts. Such authentication can involve any number of tests, keys, certificates, and handshake operations that are directed at ensuring the connected data sources and destinations are genuine and trustworthy. It is contemplated that step 138 carries out a forward attestation of the system where a data source, such as a host or network component, is verified as trustworthy before downstream data destinations, such as data storage devices. Hence, a non-limiting example of step 138 verifies a host 102 then a network controller 122, such as a node, and subsequently a local data storage server before a local data storage device destination is authorized as genuine and trustworthy.

The authentication of the various aspects of a distributed data storage system allows step 140 to bring an entire data access chain into operation, which may involve a host 102, intermediate network component 128, and destination device 104. The authenticated data access chain is then utilized in step 142 to download and implement one or more security parameters. For instance, firmware, security protocol, and network mapping information can be inputted in step 142 into a data storage device 104 to bring the device 104 into uniformity and compliance with the network 106 and other data storage devices 104 of the system. With the newly downloaded information, settings, software, and protocol, a data storage device 104 can reboot in step 144. It is contemplated that such rebooting may be a complete device power cycle or the restarting of one or more software applications. Upon the completion of the rebooting, one or more data access requests can be satisfied from the system in step 146 by storing or retrieving data from one or more connected hosts and/or data storage devices 104.

As illustrated by arrows, the assorted steps onboarding a new data storage device 104 can be susceptible to one or more side, or main, channel attacks that monitor at least one operating parameter, such as power, data signals, security credentials, or firmware updates, to gain access to a portion of the distributed data storage system. For instance, a data storage system can be particularly susceptible to attacks when a new data storage device is connected to a network, updated with security information, rebooted to initialize new security protocols, and during device/network authentication. It is noted that the online connection of a newly installed data storage device provides unwanted third-parties with the ability to track and reverse engineer portion of the data storage system, such as firmware and security protocol, that jeopardizes the integrity and reliability of the assorted data storage devices as well as the data stored on those devices.

Accordingly, various embodiments are directed to providing efficient securing of a distributed data storage system by attesting network devices and components in a flow that is backward from the flow of write data from a host/source to a memory. By attesting a data storage device before an upstream network component or host, the validation and authentication process can be relatively simple, quick, and secure due to the fewer network connections at the device-level compared to a component-level of a distributed data storage system. The ability to take a data storage device offline to conduct attestation activities further increases the efficiency and security of authentication, which is not possible with network components that would render the system useless if taken offline for the attestation of each connected device/component. Hence, the use of optimized attestation of downstream data storage devices and backward system attestation flow can allow an entire distributed data storage system to be verified as genuine and free of unwanted third-party access without degrading real-time system performance.

Figure 4:
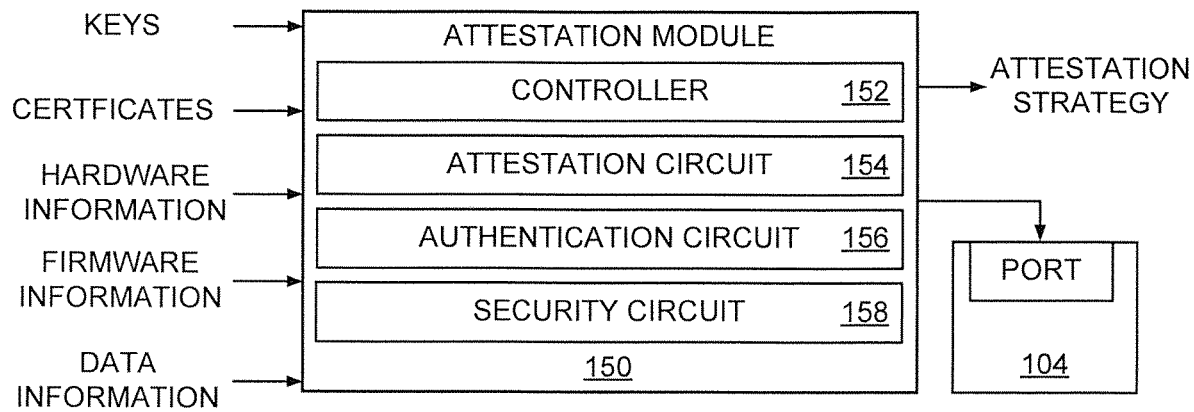
FIG. 4 depicts an example attestation module that can be utilized in a distributed data storage system in accordance with some embodiments.

FIG. 4 depicts a block representation of an example attestation module 150 that can be employed by a distributed data storage system in accordance with some embodiments to provide backward attestation of assorted devices, components, and hosts. The module 150 may be resident in hardware and/or software as a stand-alone component, such as a circuit board connected to the network, or as a supplement to an existing system component, such as a chip or circuit board of a data storage device, network server, or host.

The module 150 can utilize one or more local controllers 152, such as a microprocessor or other programmable circuitry, to direct the input of at least data storage device keys, certificates, data information, such as maps, metadata, and tables, hardware information, such as serial numbers and operating parameters, firmware information, such as version, and operating parameters, such as error rate, data access latency, and number of connected network nodes. It is contemplated, but not required, that the local controller 152 is a commandeered controller/processor 124 of the data storage device 104. Furthermore, the local controller 152 may be an independent circuit that operates in conjunction with a supplemental controller/processor 124. A local controller 152 can process one or more such inputted information to generate one or more attestation strategies that are directed at verifying the authenticity and trustworthiness of at least the connected system component, device, or host.

In some embodiments, the attestation module 150 may be an external circuit board connected to a port of a data storage device 104 to access and configure the device controller 124 to carry out an attestation strategy to efficiently and securely verify at least the connected device 104. It is contemplated that the local controller 152 takes the connected data storage device 104 offline prior to executing the attestation strategy. Such offline status may involve keeping the device 104 from initializing into the system, as in the case of a newly installed device 104, or deactivating any existing data pathways to other system components, devices, and hosts. By taking a device 104 being verified offline, the attestation module 150 can ensure the assorted keys, certificates, handshakes, and passwords are not imitated, copied, altered, or otherwise tapered with by an unauthorized attacker.

An attestation circuit 154 can provide hardware for the attestation module 150 that actually carries out the steps, commands, and requests prescribed by the attestation strategy. The attestation circuit 154 can provide at least timing, voltage, channel, and port information that allows the attestation strategy to poll and certify the genuine trustworthiness of the connected device 104. The attestation circuit 154 can be complemented by an authentication circuit 156 that provides one or more tests to attest the genuine trustworthiness of a connected data storage device, network component, or host. For instance, the authentication circuit 156 can generate and provide the attestation circuit 154 with one or more challenge questions, such as the serial number of actual physical components, passwords, certificates, or key prompts that are used individually, and collectively, to verify the history and permissions of the connected device, component, or host.

While the attestation circuit 154 and authentication circuit 156 can generate and carry out the verification of at least one data storage device 104, the respective circuits 154/156 may not be configured to generate, install, or execute proactive security measures. As a non-limiting example, the attestation and authentication circuits 154/156 can verify a component is genuine while the security circuit 158 of the attestation module 150 generates, installs, and initiates one or more security measures that are directed to ensure a verified device, component, or host maintains a trustworthy status despite the connection, verification, and initialization of additional aspects of a distributed data storage system. That is, the security circuit 158 can generate a security portion of the attestation strategy that maintains the assorted connected aspects of a distributed data storage system during operation and authentication of additional devices, components, and hosts.

It is contemplated that the security circuit 158 may prescribe reactive parameters for a data storage device, such as additional handshake, password, or certificate verification before allowing access to data, firmware, or software, to prevent and/or mitigate the effects of, third-party attacks. Some embodiments further monitor real-time operational characteristics of a system to determine if a security threat is present or likely. Hence, the hardware of the security circuit 158 provides the attestation module 150 with attack monitoring capabilities that can be used as part of the attestation strategy to prevent, and/or mitigate, third-party attacks on a device 104 and distributed data storage system.

Figure 5:
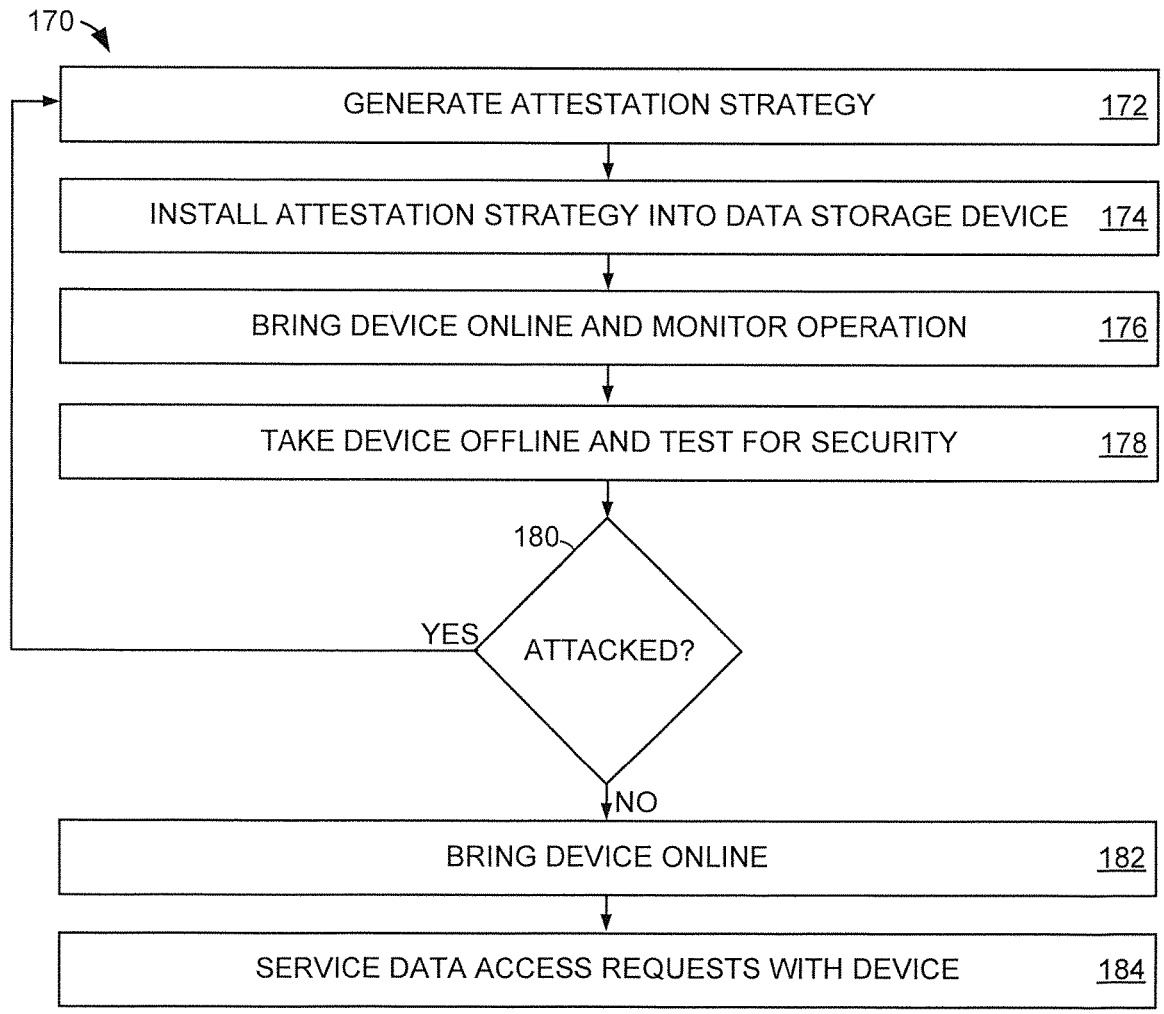
FIG. 5 illustrates an example security process that can be executed in accordance with various embodiments of a distributed data storage system.

FIG. 5 conveys an example security process 170 that can be carried out by an attestation module 150 in a distributed data storage system in accordance with various embodiments. The process 170 begins with an attestation strategy being generated in step 172 with an attestation module. The generated attestation strategy can occur while a connected data storage device is offline and prior to the device being setup or initialized into the data storage system to service a data access request. In other words, the attestation strategy may be generated in step 172 with a connected data storage device having no capability to satisfy a data access request within a system due at least to not being enabled with security permissions, such a firmware and/or software authorizations.

The attestation strategy is expected to have a proactive security aspect that aims at protecting a data storage device from unwanted accesses and/or attacks over time. Hence, the generation of the attestation strategy in step 172 involves the creation of at least one security strategy directed at preventing, or mitigating, a future third-party attack. It is contemplated that the created security strategy is based on detected, or predicted, operating conditions of the connected data storage device, which may involve the attestation running one or more tests on the data storage device while offline and before step 174 installs the attestation strategy, and associated security strategy, into the connected data storage device.

Once the attestation strategy is installed and the connected data storage device is initialized for use, step 176 brings the device online while the security circuit monitors various operating conditions, such as power consumption, firmware accesses, and failed security credentials. The detection of one or more suspicious operating conditions, which may be actual conditions, such as failed password attempts, or predicted conditions, such as patterned power consumption during security handshakes, can prompt the security circuitry to take the data storage device offline in step 178 and conduct one or more offline security tests as part of decision 180 to determine if the data storage device has been compromised by at least one third-party attack.

A determination that the device has been compromised in decision 180 triggers the generation of a new security strategy in step 172 with the logged operational conditions that led to the device being compromised. As such, a return to step 172 can result in a more rigorous, and/or carefully placed, security measures to particularly prevent/mitigate a previously experience, or predicted, third-party attack. A determination that the device has not been compromised in decision 180 triggers the device to be brought online in step 182 where system data access requests can be satisfied over time in step 184. The ability to monitor the implementation of a security strategy and adapt the strategy, if needed due to actual or predicted threats, allows a distributed data storage system to remain secure as additional devices, components, and hosts are authenticated, attested, and brought online to service data access requests.

The execution of the security process 170 over time with a distributed data storage system results in the continued evaluation, elimination, and mitigation of third-party threats. The combination of such continued security evaluation and adaptation with backward system attestation provides efficient incorporation of additional system connections without increasing the risk or likelihood of third-party attacks that could jeopardize data, device, and system integrity. It is contemplated that the execution of the security aspects of an attestation strategy over time builds a secure trust network of attested and authenticated genuine devices that can be operated without concern for downstream attacks or unauthorized accesses. However, despite having increased overall security due to backward flow attestation of data storage devices prior to upstream network components and/or hosts, a trust network can be jeopardized at various times during normal operation, such as the incorporation of additional data storage devices and initialization of new security parameters, like firmware versions, certificates, passwords, and keys.

Figure 6:
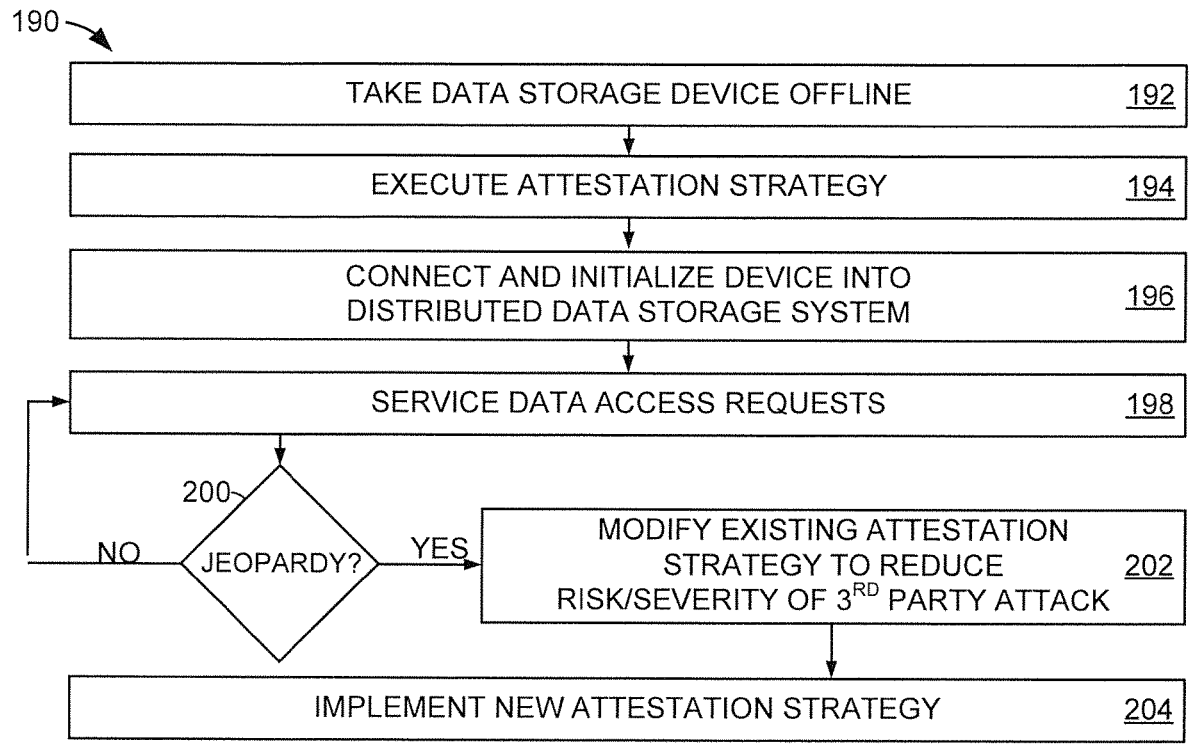
FIG. 6 shows an example external attestation routine that can be executed by a data storage device in accordance with assorted embodiments.

Accordingly, some embodiments incorporate an internal attestation into a data storage device, network component, or system host that is carried out by an attestation module 150. FIG. 6 depicts an example internal attestation routine 190 that can be executed at scheduled and triggered times after a device/component/host is online and configured to satisfy data access requests. Thus, the routine 190 initially takes a data storage device offline in step 192 and executes an attestation strategy in step 194 that verifies the source, custody, and trustworthiness of at least the firmware, security protocol, hardware, and data stored in the local device memory. The attestation strategy of step 194 may conduct one or more tests, such as passwords, challenge values, certificates, keys, and polls, to ensure that the various aspects of the data storage device is genuine, unaltered, and with a verified chain of custody.

It is noted that the initial activity of the attestation strategy in step 194 may involve internal device attestation or attestation from a previously verified device/component/host of a trust network. Such third-party attestation may involve multiple devices/components that are each offline with respect to the rest of a distributed data storage system while being connected to each other. The internal attestation of a data storage device can be particularly useful for a newly installed data storage device that is yet to be connected, or initialized, into a distributed data storage system. That is, an internal attestation can involve the verification of device trustworthiness with an attestation module that is resident in hardware in the data storage device or resident in hardware physically connected to a port of the data storage device.

With the attestation of the data storage device via execution of the attestation strategy in step 194, step 196 proceeds to connect and initialize the data storage device into the distributed data storage system. Such initialization in step 196 may involve one or more security operations, such as handshakes or other secure gateway mechanisms, that operate to confirm the identity and protocol of the newly connected data storage device. The initialization of the attested data storage device into the system allows the device to service one or more system-generated data access requests in step 198. The servicing of data access requests can be conducted cyclically any number of times over any length of time to satisfy at least data storage and data retrieval requests.

At any time during the execution of step 198, decision 200 can evaluate if the security and/or attestation protocols are in jeopardy or susceptible to a third-party attack. For instance, decision 200 can task the local attestation module of a data storage device to log device, or system, activity and detect if a third-party attack has happened or is imminent. The attestation module in decision 200 can take logged activity and predict one or more device, or system, susceptibilities to third-party attacks and determine if such susceptibilities can be reduced, eliminated, or mitigated.

If the attestation module determines a detected or predicted attack or susceptibility is present, step 202 then modifies the existing attestation strategy to reduce the risk, or severity, of a future third-party attack. In practice, for example, implementation of the new attestation strategy in step 204 can increase the number of security credentials, frequency of internal device attestation, and data encryption to reduce the chance a third-party attack will successfully gain access or reconstruct system information. It is contemplated that step 204 can initiate one or more deviations aimed at throwing a third-party attacker off, such as introducing power fluctuations, delaying data signals, or sending deliberately false security credentials or encryption keys. While not required, step 204 may involve taking a data storage device offline and/or rebooting the device to initialize new settings, parameters, and information from the updated attestation strategy.

The implementation of the new attestation strategy in step 204, or in the event no new strategy is called for in decision 200, the data storage device is called upon to service data access requests from upstream system components and hosts. The ability to conduct offline attestation of a data storage device with an attestation module allows upstream system components and other devices to be attested more efficiently and securely. By attesting a data storage device before a system component, the attestation strategy can be carried out relatively quickly as the chain of custody is greatly reduced for a downstream device compared to an upstream component.

Figure 7:
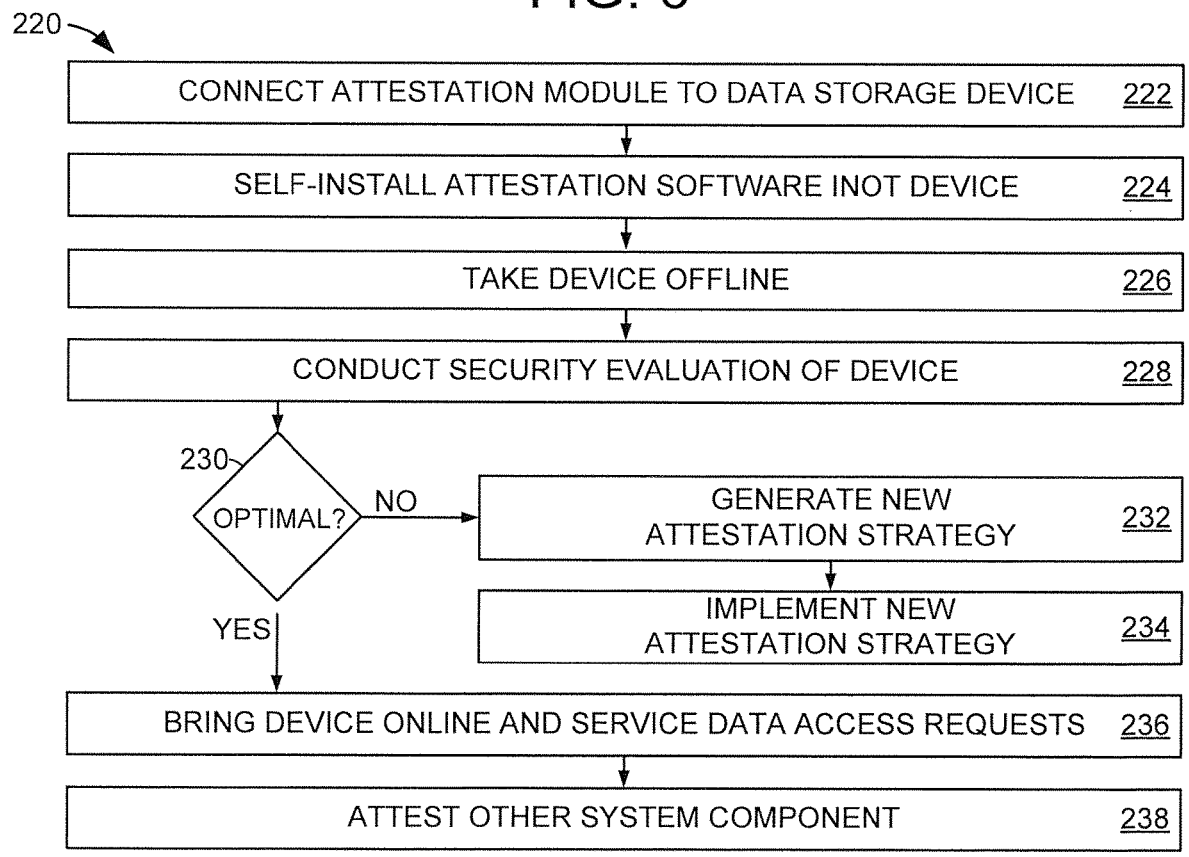
FIG. 7 is an example external attestation routine that can be executed by a data storage device in accordance with various embodiments.

While it is contemplated that an attestation module can be installed within a data storage device, system component, or host to be activated upon prompting from the module itself upon detected, or predicted, attack, threat, or susceptibility, assorted embodiments configure the attestation module as an external device card that can be selectively activated by physically connecting to a device port. FIG. 7 depicts an example external attestation routine 220 that can be carried out in one or more aspects of a distributed data storage system to provide efficient and secure attestation in a backward, downstream data destination towards upstream data source. The physical connection of an attestation module to a data storage device in step 222 initiates a self-installation of attestation software into the data storage device in step 224.

The self-installation of step 224 is autonomous and may involve one or more attestations of the module with respect to the data storage device. That is, upon connection, the attestation module may conduct one or more handshakes, key deliveries, or certificate verifications to indicate to the data storage device that the module is genuine, authentic, and trustworthy, which consequently triggers the data storage device to allow access to the attestation module. The installed attestation software can allow the attestation module to control and/or monitor various aspects of the data storage device.

Step 226 proceeds to take the data storage device offline, in the event the device was previously connected to a distributed data storage network, or prevent the device from initializing into a distributed data storage network, if not previously connected. The offline status of the data storage device after step 226 corresponds with no active data or signal pathway being present from the data storage device to any other component of a distributed data storage network, such as wired or wireless pathways that may be physically present in hardware. The offline status of the data storage device allows the attestation module to conduct one or more security evaluations in step 228 to validate the authenticity of the data storage device.

While the number and breadth of security evaluations are not limited, various embodiments conduct one or more tests with the attestation module in step 228 that verify the integrity of the device's firmware, data, and hardware. It is contemplated that a security evaluation is customized to the device by the attestation module based on the type of device, type of data stored in the device, and amount of data stored in the device. A security evaluation may involve the writing of data, reading of data, analyzing the history of data accesses, and polling the number of correct or incorrect password/key/certificate/handshakes over time or by source.

As a result of the security evaluation(s) of step 228, the attestation module can identify if the connected, offline data storage device is genuine, if the device has been the victim of an un-successful third-party attack, or if the device has been attacked and effected by a third-party attack. It is contemplated that the security evaluation(s) of step 228 can identify the type, source, and severity of third-party attacks by analyzing the past history and/or current operating condition of the data storage device.

The analysis of step 228 allows decision 230 to determine if corrective and/or preventative actions are available to optimize the current and future operation and integrity of the data storage device. For instance, decision 230 can correlate failed third-party attacks to a device to proactive actions to make such attacks, or predicted other attacks, less likely to succeed. As another non-limiting example, decision 230 can correlate data storage device operational performance, such a high performance data read latency, a high data storage capacity, or a low data error rate, with future attacks of a certain type, such as power consumption patterning during security validations. The availability for corrective/preventative actions, or in the case that decision 230 determines the device is compromised and is in need of being reformatted, triggers step 232 to generate an attestation strategy based on the findings of the security evaluations.

An attestation strategy can prescribe any number of proactive and reactive actions that are implemented into the data storage device in step 234 either immediately or upon a triggering point set by the attestation module. The conduct of step 234 can result in one or more additional levels of security, such as additional keys or certificates, alterations to existing device security, such as changing the level of data encryption, and incorporation of operating parameters, such as ignoring data accesses from identified threats, changing power consumption patterns during security validation operations, or rolling a device back to a known valid, unaltered firmware.

At the conclusion of step 234, or in the event decision 230 determines no actions are currently necessary to optimize the security of the data storage device, step 236 activates one or more data/signal pathways to bring the data storage device online in a distributed data storage network with at least one remote host and one remote data storage device. The online data storage device can then be used in step 236 to service any number of data access requests from one or more hosts. While step 236 can be conducted cyclically for any amount of time, some embodiments continue in step 238 to further attest upstream network components, such as other data storage devices, network controllers, or hosts, with the attestation module connected to the originally attested data storage device. Step 238 is contemplated to follow the same process of steps 226-236 that takes a network component being attested offline and potentially installing one or more security actions as part of an attestation strategy.

Through the various embodiments of a distributed data storage system, a data storage device can be attested and optimized while offline to ensure the subsequent authenticity of device operation. The subsequent, sequential attestation of upstream network components from the attested data storage device can efficiently certify that each link in the chain of data custody in the distributed data storage system is genuine and optimized for security. The ability for an attestation module to be resident on an external board allows for a physical key that can ensure no infiltration of a data storage device/component during attestation and optimization.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
    connecting a first data storage device to a host and a second data storage device via a network controller as part of a distributed data storage network;
    linking an attestation module to the first data storage device;
    disconnecting the first data storage device from the distributed data storage network as directed by the attestation module;
    conducting a first security evaluation of the first data storage device with the attestation module;
    verifying an authenticity of the first data storage device;
    connecting the first data storage device to the distributed data storage network;
    disconnecting the network controller from the distributed data storage network as directed by the attestation module;
    executing a second security evaluation of the network controller as directed by the attestation module;
    verifying an authenticity of the network controller;
    connecting the network controller to the distributed data storage network; and
    servicing a data access request from the host to the first data storage device via the network controller.

2. The method of claim 1, wherein linking the attestation module consists of physically inserting a printed circuit board to a port of the first data storage device.

3. The method of claim 1, wherein the authenticity of the first data storage device is conducted while the first data storage device is disconnected from any data and signal source of the distributed data storage network.

4. The method of claim 1, wherein the attestation module conducts one or more tests on the first data storage device to authenticate the first data storage device.

5. The method of claim 4, wherein the one or more tests polls static hardware information generated during manufacture of the first data storage device.

6. The method of claim 1, wherein the first security evaluation identifies a previous third-party attack on the first data storage device.

7. The method of claim 1, wherein the first security evaluation identifies a previous attempted third-party attack on the first data storage device.

8. The method of claim 7, wherein the attestation module generates a security strategy in response to the identified attempted third-party attack.

9. The method of claim 8, wherein the security strategy is executed while the first data storage device is disconnected from the distributed data storage network to increase at least one security parameter of the first data storage device.

10. The method of claim 9, wherein the at least one security parameter is an additional verification operation to be conducted before connecting the first data storage device to the distributed data storage network when servicing a data access request.

11. The method of claim 9, wherein the at least one security parameter consists of processing future data access requests with the attestation module instead of a controller of the first data storage device.

12. The method of claim 9, wherein the at least one security parameter is randomization of power consumption during security operation as directed by the attestation module.

13. A method comprising:
    connecting an attestation module to the first data storage device;
    attaching the first data storage device to a distributed data storage network comprising a network controller connecting the first data storage device to a host and a second data storage device;
    preventing the first data storage device from initializing into the distributed data storage network with the attestation module;
    conducting a first security evaluation of the first data storage device with the attestation module;
    verifying an authenticity of the first data storage device;
    initializing the first data storage device into the distributed data storage network;
    disconnecting the network controller from the distributed data storage network as directed by the attestation module;
    executing a second security evaluation of the network controller as directed by the attestation module;
    verifying an authenticity of the network controller;
    connecting the network controller to the distributed data storage network; and
    servicing a data access request from the host to the first data storage device via the network controller.

14. The method of claim 13, wherein the attestation module acts as a physical key to allow the data access request to be serviced.

15. The method of claim 13, wherein the second security evaluation is different than the first security evaluation.

16. The method of claim 13, wherein the attestation module generates and implements an attestation strategy in the first data storage device in response to the first security evaluation.

17. The method of claim 16, wherein the attestation strategy consists of at least one action to be conducted in the first data storage device to mitigate a risk of a third-party attack.

18. The method of claim 16, wherein the attestation strategy is implemented into the network controller after the authenticity of the network controller is verified.

* * * * *